(12) United States Patent
Kasaiezadeh Mahabadi et al.

(10) Patent No.: US 10,926,759 B2
(45) Date of Patent: Feb. 23, 2021

(54) CONTROLLING A VEHICLE BASED ON TRAILER POSITION

(71) Applicant: GM GLOBAL TECHNOLOGY OPERATIONS LLC, Detroit, MI (US)

(72) Inventors: SeyedAlireza Kasaiezadeh Mahabadi, Shelby Township, MI (US); Jinsong Wang, Troy, MI (US); Kausalya Singuru, Troy, MI (US); Bakhtiar B. Litkouhi, Washington, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 274 days.

(21) Appl. No.: 16/002,460

(22) Filed: Jun. 7, 2018

(65) Prior Publication Data
US 2019/0375399 A1 Dec. 12, 2019

(51) Int. Cl.
| | | |
|---|---|---|
| *B60W 30/09* | (2012.01) | |
| *G06K 9/00* | (2006.01) | |
| *G06K 9/52* | (2006.01) | |
| *G06K 9/46* | (2006.01) | |

(52) U.S. Cl.
CPC ......... *B60W 30/09* (2013.01); *G06K 9/00791* (2013.01); *G06K 9/00798* (2013.01); *G06K 9/4604* (2013.01); *G06K 9/52* (2013.01); *B60W 2520/10* (2013.01); *B60W 2552/00* (2020.02)

(58) Field of Classification Search
CPC ...... B60W 30/09; B60W 30/10; B60W 30/12; B60W 2552/00; B60W 2520/10; G06K 9/00791; G06K 9/00798; G06K 9/4604; G06K 9/52; B60R 2300/80; B60R 2300/804; B60R 2300/10; B62D 15/00; B62D 15/021; B62D 15/0255; B62D 15/029; B62D 13/00; B62D 13/005
USPC .......................... 701/36, 41, 70, 301, 116, 37
See application file for complete search history.

(56) References Cited

U.S. PATENT DOCUMENTS

| | | | | |
|---|---|---|---|---|
| 6,606,027 B1 * | 8/2003 | Reeves | ...................... | G01S 7/04 340/436 |
| 8,308,182 B2 * | 11/2012 | Ortmann | .................. | B60D 1/36 280/477 |
| 8,797,351 B2 * | 8/2014 | Augst | ................... | G06T 19/006 345/632 |
| 9,026,311 B1 * | 5/2015 | Pieronek | ............... | B60W 10/18 701/48 |
| 9,120,359 B2 * | 9/2015 | Chiu | ........................ | B60D 1/62 |
| 9,454,155 B2 * | 9/2016 | Peake | .................. | A01B 69/004 |

(Continued)

*Primary Examiner* — Richard A Goldman
(74) *Attorney, Agent, or Firm* — Cantor Colburn LLP

(57) ABSTRACT

Examples of techniques for controlling a vehicle based on trailer position are disclosed. In one example implementation according to aspects of the present disclosure, a computer-implemented method includes extracting, by a processing device, a feature point on a trailer from an image captured by a camera associated with a vehicle, the trailer being coupled to the vehicle. The method further includes determining, by the processing device, a distance between the feature point on the trailer and a virtual boundary. The method further includes, responsive to determining that the distance between the feature point on the trailer and the virtual boundary is less than a threshold, controlling, by the processing device, the vehicle to cause the distance between the feature point on the trailer and the virtual boundary to increase.

17 Claims, 6 Drawing Sheets

(56) References Cited

U.S. PATENT DOCUMENTS

| | | | |
|---|---|---|---|
| 9,738,125 B1* | 8/2017 | Brickley | B60D 1/26 |
| 9,849,911 B2* | 12/2017 | Lee | B62D 13/00 |
| 10,019,010 B2* | 7/2018 | Peake | A01B 69/008 |
| 2004/0046647 A1* | 3/2004 | Reeves | B60Q 9/006 |
| | | | 340/435 |
| 2005/0174223 A1* | 8/2005 | Egami | B62D 15/029 |
| | | | 340/440 |
| 2005/0187684 A1* | 8/2005 | Hijikata | B60N 2/6009 |
| | | | 701/45 |
| 2008/0004778 A1* | 1/2008 | Rekow | A01B 69/004 |
| | | | 701/50 |
| 2009/0030613 A1* | 1/2009 | Kataoka | G08G 1/167 |
| | | | 701/300 |
| 2009/0093928 A1* | 4/2009 | Getman | B60T 8/1708 |
| | | | 701/37 |
| 2009/0228182 A1* | 9/2009 | Waldbauer | B62D 13/00 |
| | | | 701/70 |
| 2010/0023229 A1* | 1/2010 | Chiocco | A01B 69/003 |
| | | | 701/50 |
| 2010/0084147 A1* | 4/2010 | Aral | G05D 1/021 |
| | | | 172/1 |
| 2010/0171828 A1* | 7/2010 | Ishii | G06T 7/246 |
| | | | 348/135 |
| 2010/0295668 A1* | 11/2010 | Kataoka | B62D 15/025 |
| | | | 340/435 |
| 2011/0022282 A1* | 1/2011 | Wu | B60D 1/58 |
| | | | 701/70 |
| 2011/0118926 A1* | 5/2011 | Peake | G01C 21/34 |
| | | | 701/25 |
| 2011/0231095 A1* | 9/2011 | Nakada | B60W 30/12 |
| | | | 701/301 |
| 2012/0312617 A1* | 12/2012 | Makisalo | B62D 53/02 |
| | | | 180/204 |
| 2013/0030665 A1* | 1/2013 | Nishio | B60W 10/184 |
| | | | 701/70 |
| 2013/0213518 A1* | 8/2013 | Bonefas | A01D 75/00 |
| | | | 141/1 |
| 2013/0222592 A1* | 8/2013 | Gieseke | G08G 1/096708 |
| | | | 348/148 |
| 2014/0057237 A1* | 2/2014 | Chen | B62D 15/028 |
| | | | 434/305 |
| 2014/0160276 A1* | 6/2014 | Pliefke | B60R 11/04 |
| | | | 348/118 |
| 2014/0200759 A1* | 7/2014 | Lu | B60D 1/245 |
| | | | 701/28 |
| 2014/0249691 A1* | 9/2014 | Hafner | B62D 15/0275 |
| | | | 701/1 |
| 2014/0267688 A1* | 9/2014 | Aich | B60W 50/0097 |
| | | | 348/113 |
| 2014/0285330 A1* | 9/2014 | Kouhia | B66C 19/002 |
| | | | 340/425.5 |
| 2014/0303849 A1* | 10/2014 | Hafner | B60W 50/14 |
| | | | 701/42 |
| 2014/0324325 A1* | 10/2014 | Schlensag | B60W 30/18163 |
| | | | 701/116 |
| 2015/0002670 A1* | 1/2015 | Bajpai | B60R 1/00 |
| | | | 348/148 |
| 2015/0158527 A1* | 6/2015 | Hafner | B62D 15/027 |
| | | | 701/41 |
| 2015/0210254 A1* | 7/2015 | Pieronek | B60W 10/18 |
| | | | 701/70 |
| 2015/0253427 A1* | 9/2015 | Slichter | A01B 69/007 |
| | | | 356/5.01 |
| 2015/0274163 A1* | 10/2015 | Terazawa | B60W 10/20 |
| | | | 701/41 |
| 2015/0274164 A1* | 10/2015 | Terazawa | B62D 15/025 |
| | | | 701/41 |
| 2015/0294166 A1* | 10/2015 | Kuehnle | B60Q 9/008 |
| | | | 701/70 |
| 2015/0346728 A1* | 12/2015 | Peake | G05D 1/0219 |
| | | | 701/23 |
| 2016/0049020 A1* | 2/2016 | Kuehnle | G06T 7/75 |
| | | | 701/34.4 |
| 2016/0052548 A1* | 2/2016 | Singh | B60D 1/36 |
| | | | 701/37 |
| 2016/0075334 A1* | 3/2016 | Terazawa | B62D 15/025 |
| | | | 701/41 |
| 2016/0098604 A1* | 4/2016 | Min | B60R 1/00 |
| | | | 701/41 |
| 2016/0152263 A1* | 6/2016 | Singh | B60T 8/1708 |
| | | | 701/41 |
| 2016/0229402 A1* | 8/2016 | Morita | G08G 1/096758 |
| 2016/0363936 A1* | 12/2016 | Peake | G05D 1/0212 |
| 2017/0144704 A1* | 5/2017 | Robinson | B60Q 9/00 |
| 2017/0236413 A1* | 8/2017 | Takagi | B60W 40/09 |
| | | | 701/117 |
| 2017/0242095 A1* | 8/2017 | Schuh | G05D 1/0293 |
| 2017/0247032 A1* | 8/2017 | Lee | B62D 15/025 |
| 2017/0247054 A1* | 8/2017 | Lee | B62D 15/029 |
| 2017/0341583 A1* | 11/2017 | Zhang | B60R 1/00 |
| 2018/0068447 A1* | 3/2018 | Prasad | B60D 1/06 |
| 2018/0068566 A1* | 3/2018 | Prasad | B60W 30/12 |
| 2018/0237012 A1* | 8/2018 | Jammoussi | G05D 1/0088 |
| 2018/0281679 A1* | 10/2018 | Lewis | B60R 1/00 |
| 2018/0334188 A1* | 11/2018 | Maier | B62D 15/029 |
| 2018/0372875 A1* | 12/2018 | Juelsgaard | G05D 1/0088 |
| 2019/0016264 A1* | 1/2019 | Potnis | B60D 1/64 |
| 2019/0059199 A1* | 2/2019 | Stanhope | G05D 1/0246 |
| 2019/0064837 A1* | 2/2019 | Miller | G08G 1/168 |
| 2019/0071088 A1* | 3/2019 | Hu | G06T 7/60 |
| 2019/0118814 A1* | 4/2019 | Wood | B60Q 1/346 |
| 2019/0235504 A1* | 8/2019 | Carter | G05D 1/0246 |
| 2019/0265714 A1* | 8/2019 | Ball | G06N 7/02 |
| 2019/0276078 A1* | 9/2019 | Pourrezaei Khaligh | B62D 13/005 |
| 2019/0339708 A1* | 11/2019 | Ramirez Llanos | B60R 1/00 |
| 2019/0347498 A1* | 11/2019 | Herman | G06T 7/11 |
| 2019/0354101 A1* | 11/2019 | Sujan | G08G 1/22 |
| 2019/0375399 A1* | 12/2019 | Kasaiezadeh Mahabadi | B60W 30/09 |
| 2019/0375454 A1* | 12/2019 | Kasaiezadeh Mahabadi | B62D 13/00 |
| 2020/0001790 A1* | 1/2020 | Ling | B62D 15/0285 |
| 2020/0039483 A1* | 2/2020 | Nemeth | G08G 1/167 |
| 2020/0039514 A1* | 2/2020 | Shivamurthy | G06K 9/00791 |
| 2020/0051299 A1* | 2/2020 | Okano | H04N 7/18 |
| 2020/0057453 A1* | 2/2020 | Laws | B60W 10/20 |
| 2020/0090360 A1* | 3/2020 | Starr | G06T 7/55 |
| 2020/0094743 A1* | 3/2020 | Carpenter | B60R 1/003 |
| 2020/0164803 A1* | 5/2020 | Jales Costa | B62D 15/027 |

\* cited by examiner

CONTROLLING A VEHICLE BASED ON TRAILER POSITION

INTRODUCTION

The subject disclosure relates to controlling a vehicle and, more particularly, to controlling a vehicle based on trailer position.

Modern vehicles (e.g., a car, a motorcycle, a boat, or any other type of vehicle) generally include one or more cameras that provide backup assistance, take images of the vehicle driver to determine driver drowsiness or attentiveness, provide images of the road, as the vehicle is traveling, for collision avoidance purposes, provide structure recognition, such as roadway signs, etc. For example, a vehicle can be equipped with multiple cameras, and images from multiple cameras (referred to as "surround view cameras") can be used to create a "surround" or "bird's eye" view of the vehicle. Some of the cameras (referred to as "long-range cameras") can be used to capture long-range images (e.g., for object detection for collision avoidance, structure recognition, etc.).

These vehicles may also be equipped with an in-vehicle display (e.g., a touchscreen) that is used to display camera images and/or other images to a driver of the vehicle. For example, a traditional rear-view mirror and/or side-view mirror may be replaced with a display that displays a camera image from a camera positioned at the rear of the vehicle to display the "rear view" to the driver in place of the traditional rear-view mirror.

SUMMARY

In one exemplary embodiment, a computer-implemented method for controlling a vehicle based on trailer position is provided. The method includes extracting, by a processing device, a feature point on a trailer from an image captured by a camera associated with a vehicle, the trailer being coupled to the vehicle. The method further includes determining, by the processing device, a distance between the feature point on the trailer and a virtual boundary. The method further includes, responsive to determining that the distance between the feature point on the trailer and the virtual boundary is less than a threshold, controlling, by the processing device, the vehicle to cause the distance between the feature point on the trailer and the virtual boundary to increase.

In addition to one or more of the features described herein, the method can further include generating, by the processing device, the virtual boundary based at least in part on a detected road feature. In some examples, controlling the vehicle includes causing the vehicle to shift with respect to a center line associated with the vehicle. In addition to one or more of the features described herein, the method can further include, prior to extracting the feature point, capturing a plurality of images using the camera, wherein the image is one of the plurality of images. In some examples, the feature point is a first feature point, the image is a first image, and the camera is a first camera, and the method further includes extracting, by the processing device, a second feature point on the trailer from a second image captured by a second camera associated with the vehicle. In some examples, the distance between the first feature point on the trailer and the virtual boundary is determined based at least in part on a triangulation process. In some examples, the threshold is based at least in part on a road characteristic and a vehicle speed.

In another exemplary embodiment, a system is provided that includes a memory including computer readable instructions, and a processing device for executing the computer readable instructions for performing a method for controlling a vehicle based on trailer position. The method includes extracting, by a processing device, a feature point on a trailer from an image captured by a camera associated with a vehicle, the trailer being coupled to the vehicle. The method further includes determining, by the processing device, a distance between the feature point on the trailer and a virtual boundary. The method further includes, responsive to determining that the distance between the feature point on the trailer and the virtual boundary is less than a threshold, controlling, by the processing device, the vehicle to cause the distance between the feature point on the trailer and the virtual boundary to increase.

In addition to one or more of the features described herein, the method can further include generating, by the processing device, the virtual boundary based at least in part on a detected road feature. In some examples, controlling the vehicle includes causing the vehicle to shift with respect to a center line associated with the vehicle. In addition to one or more of the features described herein, the method can further include, prior to extracting the feature point, capturing a plurality of images using the camera, wherein the image is one of the plurality of images. In some examples, the feature point is a first feature point, the image is a first image, and the camera is a first camera, and the method further includes extracting, by the processing device, a second feature point on the trailer from a second image captured by a second camera associated with the vehicle. In some examples, the distance between the first feature point on the trailer and the virtual boundary is determined based at least in part on a triangulation process. In some examples, the threshold is based at least in part on a road characteristic and a vehicle speed.

In yet another exemplary embodiment, a computer program product is provided that includes a computer readable storage medium having program instructions embodied therewith, the program instructions executable by a processing device to cause the processing device to perform a method for controlling a vehicle based on trailer position. The method includes extracting, by a processing device, a feature point on a trailer from an image captured by a camera associated with a vehicle, the trailer being coupled to the vehicle. The method further includes determining, by the processing device, a distance between the feature point on the trailer and a virtual boundary. The method further includes, responsive to determining that the distance between the feature point on the trailer and the virtual boundary is less than a threshold, controlling, by the processing device, the vehicle to cause the distance between the feature point on the trailer and the virtual boundary to increase.

In addition to one or more of the features described herein, the method can further include generating, by the processing device, the virtual boundary based at least in part on a detected road feature. In some examples, controlling the vehicle includes causing the vehicle to shift with respect to a center line associated with the vehicle. In addition to one or more of the features described herein, the method can further include, prior to extracting the feature point, capturing a plurality of images using the camera, wherein the image is one of the plurality of images. In some examples, the feature point is a first feature point, the image is a first image, and the camera is a first camera, and the method further includes extracting, by the processing device, a second feature point on the trailer from a second image captured by a second camera associated with the vehicle. In some examples, the distance between the first feature point on the trailer and the virtual boundary is determined based at least in part on a triangulation process.

The above features and advantages, and other features and advantages of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which.

DETAILED DESCRIPTION

Figure 1:
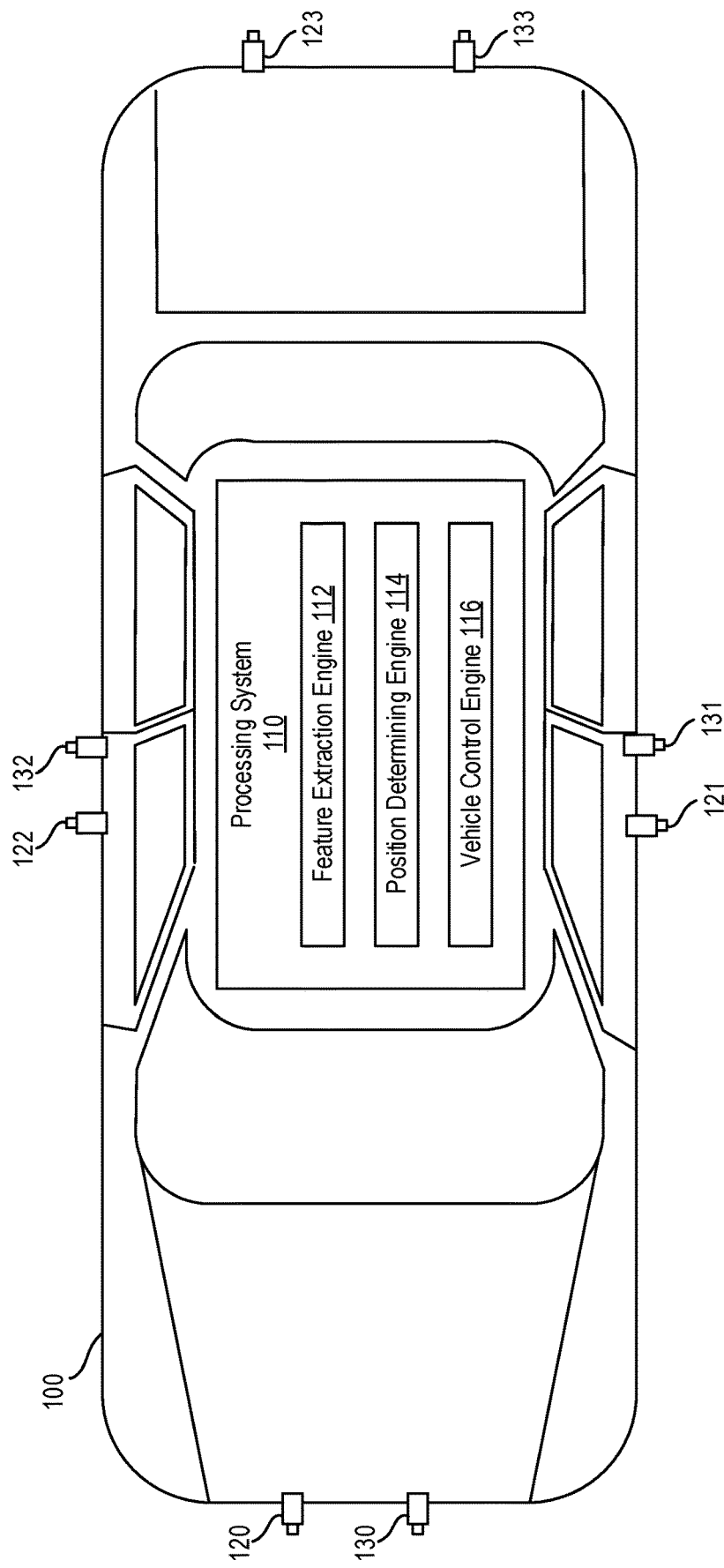
FIG. 1 depicts a vehicle including cameras and a processing system for controlling the vehicle based at least in part on trailer position according to one or more embodiments.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The technical solutions described herein provide for controlling a vehicle having a trailer attached thereto based on the position of the trailer. The present techniques prevent a trailer (being attached to a vehicle) from crossing lane/road/curb boundaries by extracting (from an image) a feature point on a trailer, determining a distance between the feature point and a boundary, and controlling the vehicle to maintain separation between the feature point on the trailer and the boundary. This can be beneficial for automated driving, where real-time trailer and vehicle position monitoring is important for preventing lane crossing and/or collisions. Existing approaches can be inaccurate, such as a GPS-based error in localization, inaccuracy of hitch angles estimation, and trailer length-width ratio calculations are prone to error and can result in lane crossings. The present techniques provide improvements in monitoring the trailer position relative to a boundary (e.g., a lane marking) without being affected by inaccuracy in hitch angle, trailer length, width, and weight estimation and localization.

FIG. 1 depicts a vehicle 100 including a processing system 110 for controlling the vehicle 100 based at least in part on trailer position. The vehicle 100 may be a car, truck, van, bus, motorcycle, or another suitable vehicle to which a trailer can be attached. The trailer can be attached to the vehicle 100 by a suitable connection, such as a tow hitch, a fifth-wheel coupling, or another suitable connection.

When the vehicle 100 and trailer (such as the trailer 201 of FIG. 2) traverse a road (such as the road 202 of FIG. 2), the trailer can tend to cross lane markings, curbs, and/or road boundaries (e.g., the boundary 203 of FIG. 2), such as when the vehicle 100 is in a curve or turn. The processing system 110 associated with the vehicle 100 aids in controlling the vehicle 100 based at least in part on the position of the trailer. For example, the vehicle 100 can be controlled to cause the vehicle 100 and the trailer 201 to stay within certain boundaries. To do this, the processing system 110 of the vehicle 100 utilizes a feature extraction engine 112, a position determining engine 114, and a vehicle control engine 116.

The feature extraction engine 112 determines a feature point on the trailer using one or more cameras. In particular, the vehicle 100 may include cameras 120, 121, 122, 123, and cameras 130, 131, 132, 133. The cameras 120-123 are surround view cameras that capture images external to, and in near proximity to, the vehicle 100. The images captured by the cameras 120-123 together form a surround view (sometimes referred to as a "top-down view" or a "bird's eye view") of the vehicle 100. These images can be used for operating the vehicle (e.g., parking, backing, etc.). The cameras 130-133 are long-range cameras that capture images external to the vehicle and farther away from the vehicle 100 than the cameras 120-123. These images can be used for object detection and avoidance, for example. It should be appreciated that, although eight cameras 120-123 and 130-133 are shown, more or fewer cameras may be implemented in various embodiments.

The captured images can be displayed on a display (not shown) to provide external views of the vehicle 100 to the driver/operator of the vehicle 100. The captured images can be displayed as live images, still images, or some combination thereof. In some examples, the images can be combined to form a composite view, such as the surround view.

The feature extraction engine 112 uses images captured from one or more of the cameras 120-123, 130-133. For example, the cameras 121, 133 can each capture images of the trailer from the vehicle 100. The feature extraction engine 112 can use image recognition techniques to identify a feature point, such as a front corner of the trailer, a rear corner of the trailer, etc.) from the images.

Figure 2:
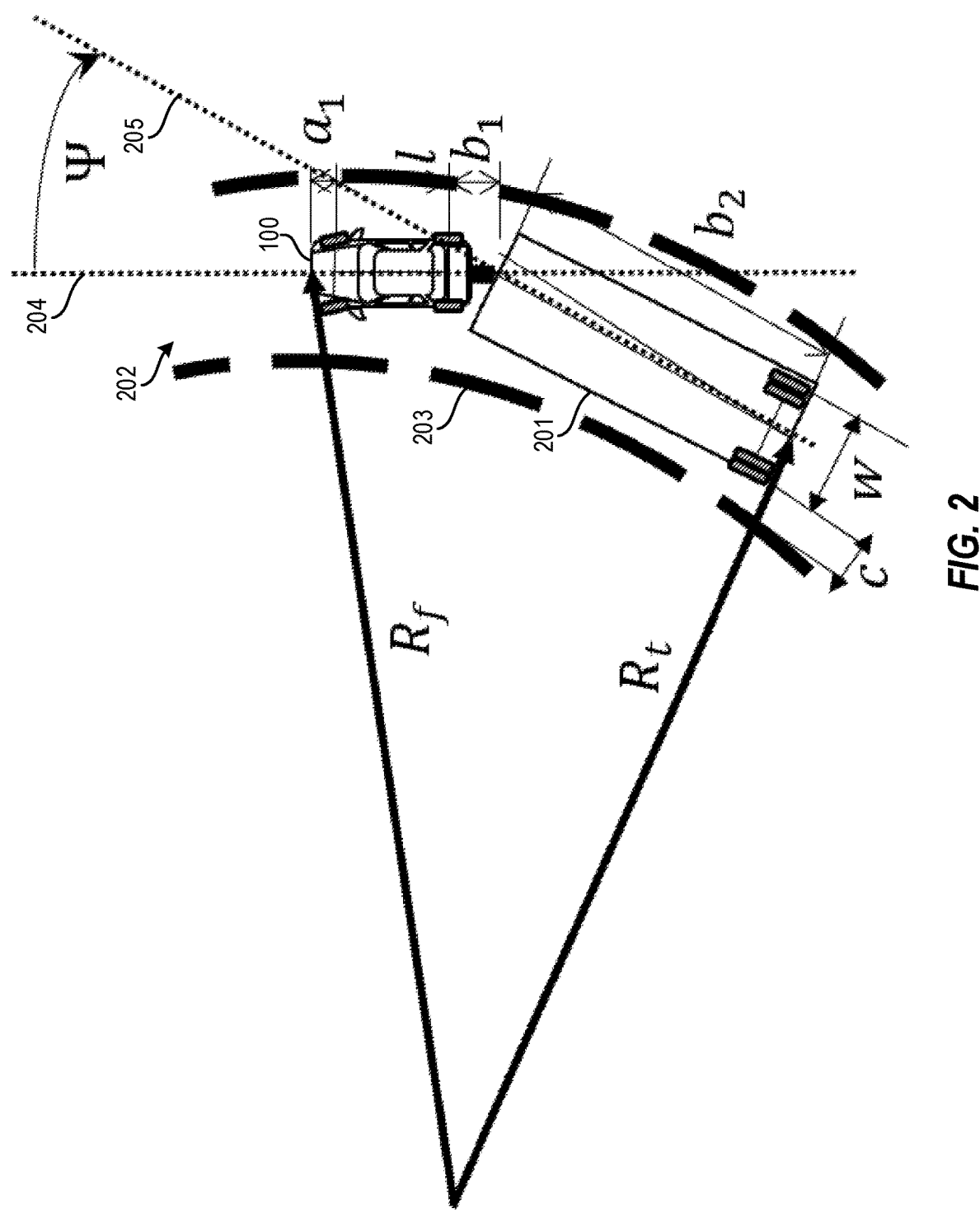
FIG. 2 depicts the vehicle of FIG. 1 having a trailer attached thereto according to one or more embodiments.

The position determining engine 114 can use the feature point extracted by the feature extraction engine 112 to determine a distance "c" between the feature point and a virtual boundary (FIG. 2). The virtual boundary can represent an actual lane boundary or another boundary, and the virtual boundary can be generated from a detected road feature. For example, the virtual boundary can be based on a detected curb, lane line, etc., using image processing techniques on images captured by one or more of the cameras 120-123, 130-133. If the distance "c" between the feature point and the virtual boundary is below an acceptable distance, the vehicle control engine 116 can control the vehicle to cause the vehicle (and, accordingly, the trailer) to move such that the distance between the feature point and the virtual boundary is increased to an acceptable distance. It should be appreciated that the acceptable distance (i.e., threshold) can vary based on factors such as a speed of the vehicle 100, a vehicle in an adjacent lane, road characteristics (such as lane width, road curvature, and the like), etc.

For example, as the speed of the vehicle 100 increases, the acceptable distance increases.

The various components, modules, engines, etc. described regarding FIG. 1 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include a processing device (e.g., the CPU 621 of FIG. 6) for executing those instructions. Thus a system memory (e.g., the RAM 624 of FIG. 6) can store program instructions that when executed by the processing device implement the engines described herein. Other engines can also be utilized to include other features and functionality described in other examples herein.

FIG. 2 depicts the vehicle 100 having a trailer 201 attached thereto according to one or more embodiments. The vehicle 100 is traveling along a road 202, which as shown, is curved. As the vehicle 100 navigates the curve, the trailer 201 may tend to cross the boundary (e.g., the lane boundary 203). Using the present techniques, the vehicle 100 can be controlled to prevent and/or correct this tendancy.

FIG. 2 includes variables defined as follows: Rf represents the turning radius of the vehicle 100 (with respect to the front of the vehicle); Rt represents the turning radius of the trailer 201 (with respect to the end of the trailer); Ψ represents the articulation angle between a center line 204 of the vehicle 100 and a center line 205 of the trailer 201; "a1" represents the distance between the front of the vehicle 100 and the front axle of the vehicle 100; "l" represents the wheel base of the vehicle 100; "b1" represents the distance between the rear axle of the vehicle 100 and the rear of the vehicle 100; "b2" represents the length of the trailer; "w" represents the width of the trailer 201 at the rear of the trailer; and "c" represents a crossing parameter, which is the distance between a feature point of the trailer and the boundary 203. It is a goal of the present techniques to maintain a value of "c" that is greater than zero in order to maintain separation between the boundary 203 and the trailer 201.

Figure 3:
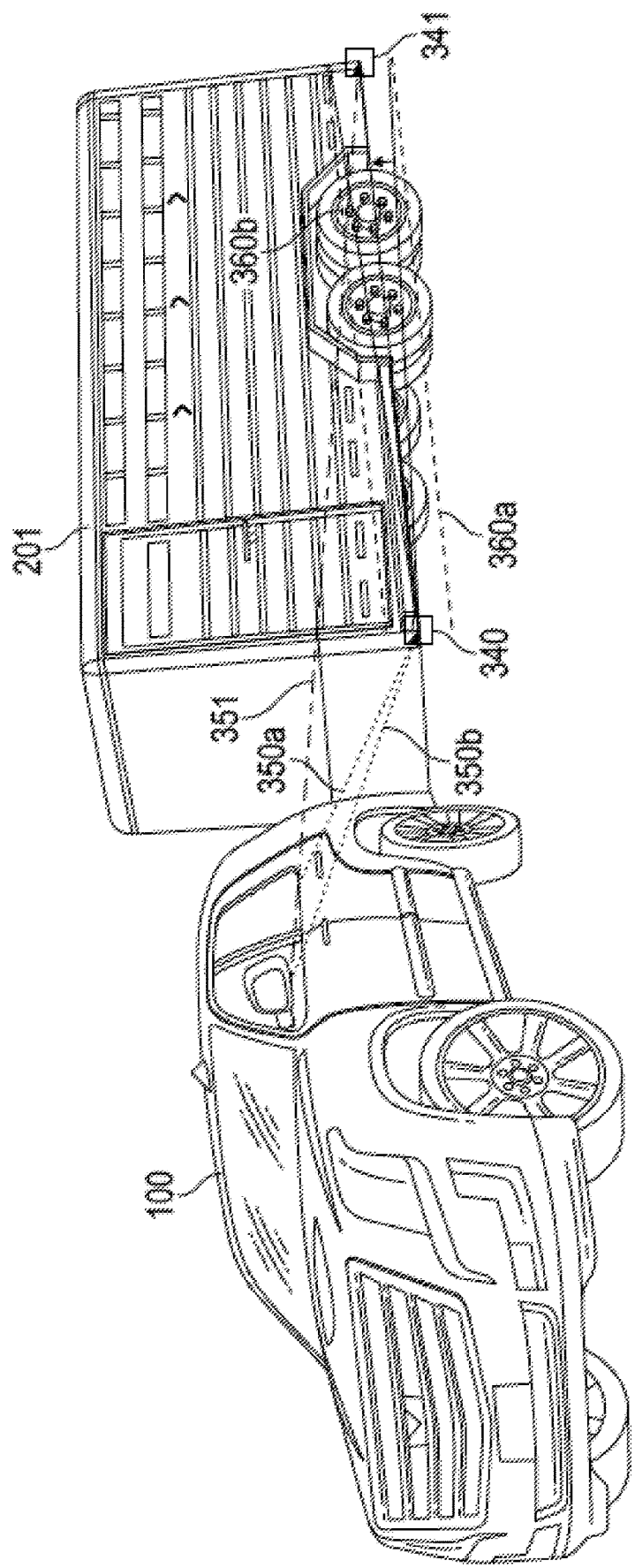
FIG. 3 depicts the vehicle and trailer of FIG. 2 according to one or more embodiments.

FIG. 3 depicts the vehicle 100 and the trailer 201 according to one or more embodiments. In this example, two feature points are extracted by the feature extraction engine 112: a front-end feature point 340 of the trailer 201 and a rear-end feature point 341 of the trailer 201. The front-end feature point 340 is a location on the trailer 340 and is determined when the location is visible to two different cameras on the vehicle 100 (e.g., the cameras 121, 123; the cameras 121, 133; the cameras 132, 133, etc.). The visibility from the two different cameras to the front-end feature point is depicted by the lines 350a, 350b.

The rear-end feature point 341 is determined using a single camera on the vehicle 100 (e.g., the camera 121, the camera 131, the camera 122, the camera 132, etc.) The visibility from the camera to the rear-end feature point 341 is depicted by the line 351.

A side camera position (e.g. the camera 121) "Ps" and a rear camera position (e.g. the camera 123) "Pr" are known based on the specifications of the vehicle 100. The feature points 340, 341 represent trailer corners, and the position of the feature points 340, 341 Pl/rf can be determined or estimated using triangulation techniques. The side camera (e.g., the camera 121) can be used to estimate the trailer's rear-end feature point. For a given angular deviation from the horizon (i.e., pitch angle) $\phi$th, where $\phi$ is greater than a pitch angle threshold $\phi$th, the position of the rear-end feature point 341 can be estimated with a bounded error, depicted by the bounded lines 360a, 360b. The bounded error can be based on the trailer length, the pitch angle, and the location of the feature point 341 Pl/rf.

Figure 4:
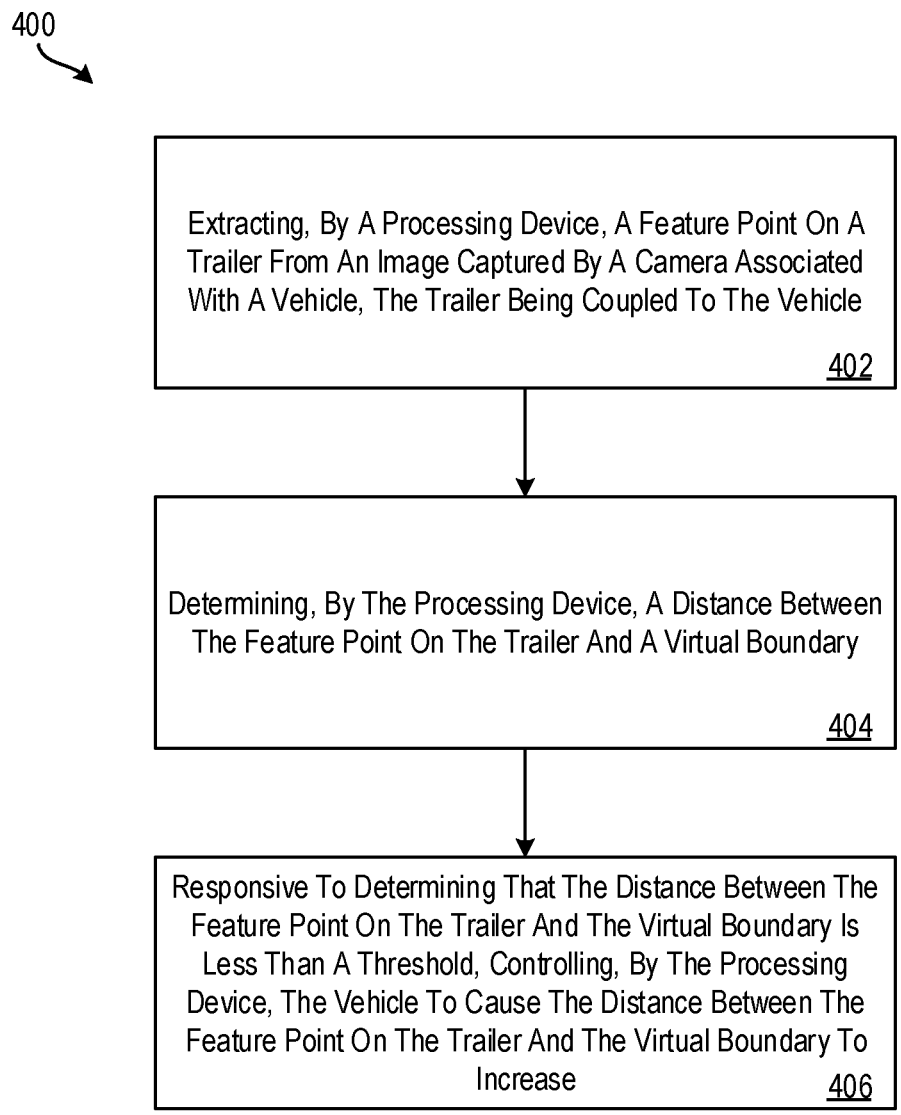
FIG. 4 depicts a flow diagram of a method for controlling a vehicle based at least in part on trailer position according to one or more embodiments.

FIG. 4 depicts a flow diagram of a method 400 for controlling a vehicle based at least in part on trailer position according to one or more embodiments. The method 400 can be performed by any suitable processing system and/or processing device, such as the processing system 110 of FIG. 1, the processing system 600 of FIG. 6, or another suitable processing device and/or processing system.

At block 402, the feature extraction engine 112 extracts a feature point (e.g., the feature point 341) on a trailer (e.g., the trailer 201) from an image captured by a camera (e.g., one or more of the cameras 120-123, 130-133) associated with a vehicle (e.g., the vehicle 100), the trailer being coupled to the vehicle.

At block 404, the position determining engine 114 determines a distance between the feature point on the trailer and a virtual boundary.

At block 406, the vehicle control engine 116 controls the vehicle to cause the distance between the feature point on the trailer and the virtual boundary to increase when it is determined that the distance between the feature point on the trailer and the virtual boundary is less than the threshold.

Additional processes also may be included, and it should be understood that the process depicted in FIG. 4 represents an illustration, and that other processes may be added or existing processes may be removed, modified, or rearranged without departing from the scope and spirit of the present disclosure.

Figure 5:
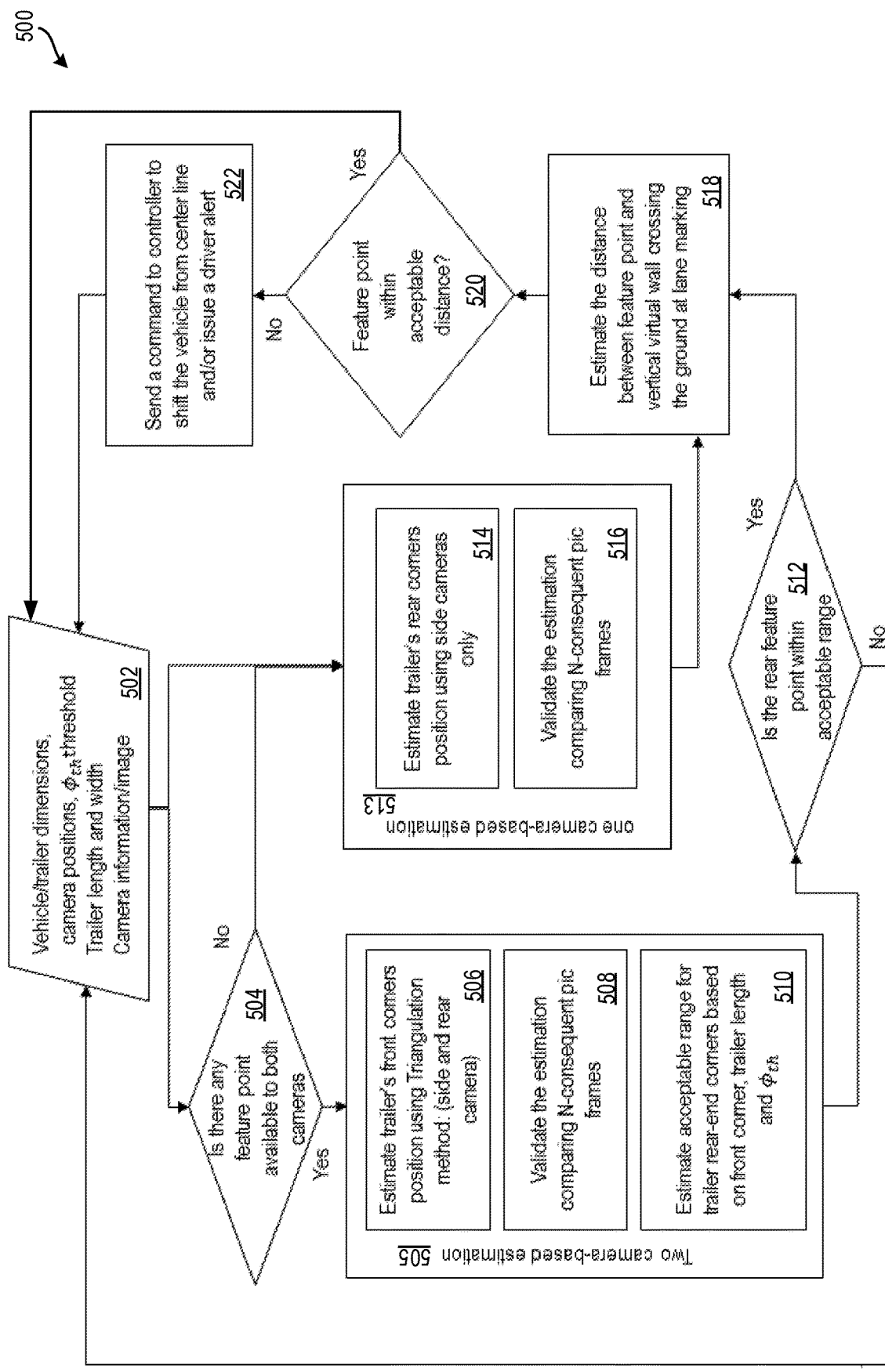
FIG. 5 depicts a flow diagram of a method for controlling a vehicle based at least in part on trailer position according to one or more embodiments.

FIG. 5 depicts a flow diagram of a method 500 for controlling a vehicle based at least in part on trailer position according to one or more embodiments. The method 500 can be performed by any suitable processing system and/or processing device, such as the processing system 110 of FIG. 1, the processing system 600 of FIG. 6, or another suitable processing device and/or processing system.

At block 502, the method 500 begins, and information is received, such as vehicle and trailer dimensions, camera positions, pitch angle threshold $\phi$th, and the like. At decision block 504, it is determined whether there is a feature point available to two different cameras (e.g., the camera 121 and the camera 123). This determines whether a two-camera-based estimation 505 is utilized or a one-camera-based estimation 513 is utilized.

When it is determined at decision block 504 that there is a feature point available to both two different cameras, the two-camera-based estimation 505 is utilized. At block 506, the feature extraction engine 112 estimates a front-end feature point of the trailer's front-end using a triangulation technique using the two different cameras. At block 508, the feature extraction engine 112 validates the estimation by comparing consequent images (i.e., frames) from the cameras. At block 510, the feature extraction engine 112 estimates an acceptable range for the trailer rear-end corner based on the front-end corner, the trailer length, and the pitch angle threshold $\phi$th. At decision block 512, it is then determined whether a rear-end feature point is within an acceptable range. If not, the method 500 returns to block 502. However, if the rear-end feature point is within an acceptable range, the method proceeds to block 518, and the two-camera-based estimation 505 is complete.

When it is determined at decision block 504 that there is not a feature point available to two different cameras, the one-camera-based estimation 513 is utilized. At block 514, the feature point engine 112 estimates a rear feature point using a single camera (e.g., the camera 121). At block 516, the feature point engine 112 validates the estimation by comparing consequent images (i.e., frames) from the cameras. The method proceeds to block 518, and the one-camera-based estimation 513 is complete.

At block 518, the position determining engine 114, determines a distance "c" between the feature point (from the two-camera-based estimation 505 or the one-camera-based estimation 513) and a virtual boundary. At decision block 520, it is then determined whether the feature point is an acceptable distance from the virtual boundary (i.e., whether the distance "c" is greater than a threshold). If at decision block 520, it is determined that the distance "c" is acceptable, the method 500 ends or returns to block 502. If at decision block 520, it is determined that the distance "c" is not acceptable, the method proceeds to block 522, and the vehicle control engine 116 sends a command to cause the vehicle to move such that the vehicle shifts with respect to its center line (e.g., center line 204) to cause the distance "c" to be acceptable (i.e., greater than the threshold). The method 500 then returns to block 502 and restarts.

Additional processes also may be included, and it should be understood that the process depicted in FIG. 5 represents an illustration, and that other processes may be added or existing processes may be removed, modified, or rearranged without departing from the scope and spirit of the present disclosure.

Figure 6:
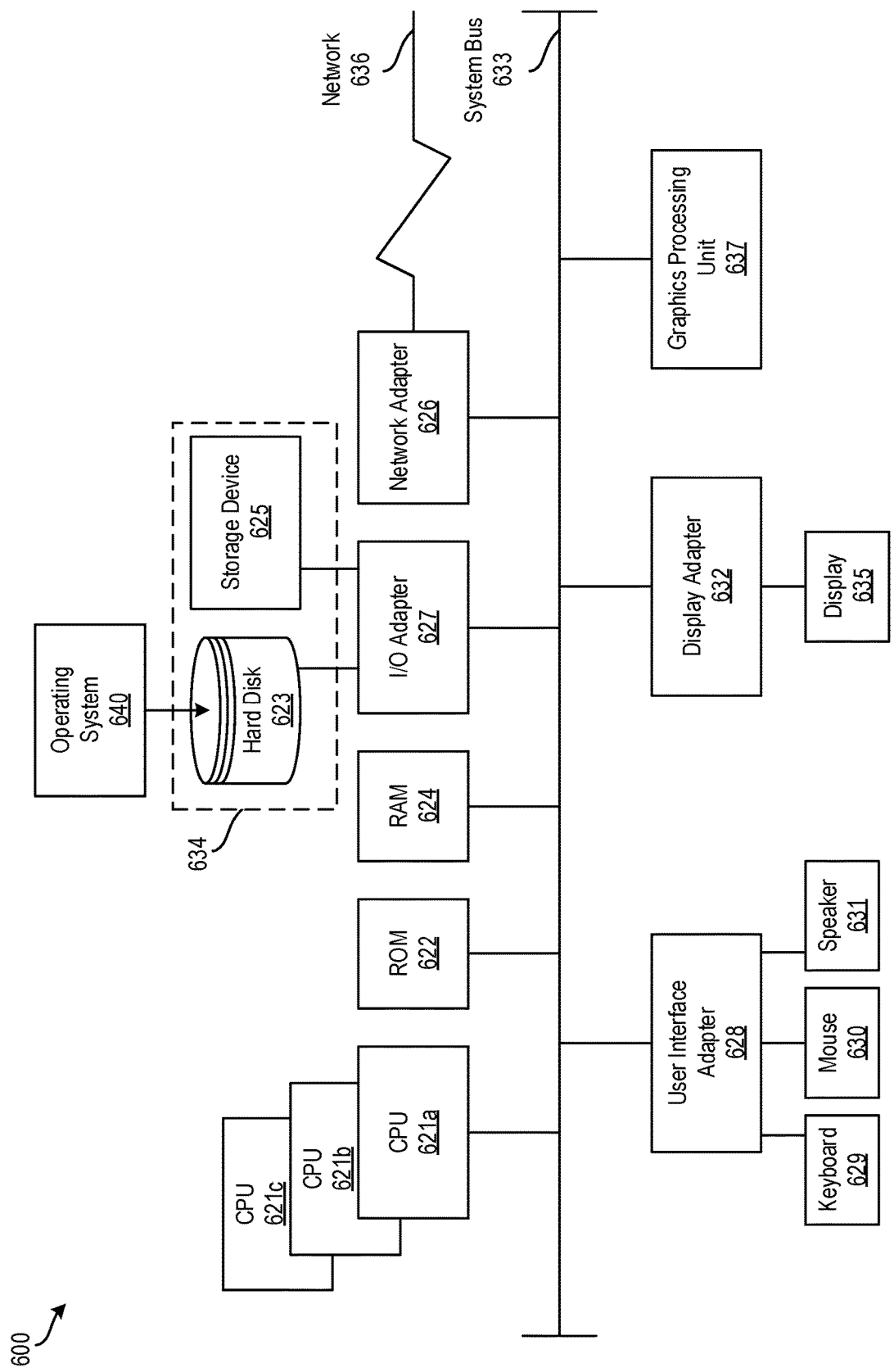
FIG. 6 depicts a block diagram of a processing system for implementing the techniques described herein according to aspects of the present disclosure.

It is understood that the present disclosure is capable of being implemented in conjunction with any type of computing environment now known or later developed. For example, FIG. 6 depicts a block diagram of a processing system 600 for implementing the techniques described herein. In examples, processing system 600 has one or more central processing units (processors) 621a, 621b, 621c, etc. (collectively or generically referred to as processor(s) 621 and/or as processing device(s)). In aspects of the present disclosure, each processor 621 can include a reduced instruction set computer (RISC) microprocessor. Processors 621 are coupled to system memory (e.g., random access memory (RAM) 624) and various other components via a system bus 633. Read only memory (ROM) 622 is coupled to system bus 633 and may include a basic input/output system (BIOS), which controls certain basic functions of processing system 600.

Further depicted are an input/output (I/O) adapter 627 and a network adapter 626 coupled to system bus 633. I/O adapter 627 may be a small computer system interface (SCSI) adapter that communicates with a hard disk 623 and/or another storage drive 625 or any other similar component. I/O adapter 627, hard disk 623, and storage device 625 are collectively referred to herein as mass storage 634. Operating system 640 for execution on processing system 600 may be stored in mass storage 634. The network adapter 626 interconnects system bus 633 with an outside network 636 enabling processing system 600 to communicate with other such systems.

A display (e.g., a display monitor) 635 is connected to system bus 633 by display adaptor 632, which may include a graphics adapter to improve the performance of graphics intensive applications and a video controller. In one aspect of the present disclosure, adapters 626, 627, and/or 232 may be connected to one or more I/O busses that are connected to system bus 633 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 633 via user interface adapter 628 and display adapter 632. A keyboard 629, mouse 630, and speaker 631 (for instance) may be interconnected to system bus 633 via user interface adapter 628, which may include, for example, a Super I/O chip integrating multiple device adapters into a single integrated circuit.

In some aspects of the present disclosure, processing system 600 includes a graphics processing unit 637. Graphics processing unit 637 is a specialized electronic circuit designed to manipulate and alter memory to accelerate the creation of images in a frame buffer intended for output to a display. In general, graphics processing unit 637 is very efficient at manipulating computer graphics and image processing, and has a highly parallel structure that makes it more effective than general-purpose CPUs for algorithms where processing of large blocks of data is done in parallel.

Thus, as configured herein, processing system 600 includes processing capability in the form of processors 621, storage capability including system memory (e.g., RAM 624), and mass storage 634, input means such as keyboard 629 and mouse 630, and output capability including speaker 631 and display 635. In some aspects of the present disclosure, a portion of system memory (e.g., RAM 624) and mass storage 634 collectively store an operating system to coordinate the functions of the various components shown in processing system 600.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A computer-implemented method comprising:
   extracting, by a processing device, a feature point on a trailer from an image captured by a camera associated with a vehicle, wherein the trailer is coupled to the vehicle;
   estimating, by the processing device, a position of the feature point with a bounded error, the bounded error being based at least in part on a length of the trailer, a pitch angle, and a location of the feature point;
   determining, by the processing device, a distance between the feature point on the trailer and a virtual boundary; and
   responsive to determining that the distance between the feature point on the trailer and the virtual boundary is less than a threshold, controlling, by the processing device, the vehicle to cause the distance between the feature point on the trailer and the virtual boundary to increase.

2. The computer-implemented method of claim 1, further comprising generating, by the processing device, the virtual boundary based at least in part on a detected road feature.

3. The computer-implemented method of claim 1, further comprising, prior to the extracting the feature point, capturing a plurality of images using the camera, wherein the image is one of the plurality of images.

4. The computer-implemented method of claim 1, wherein the feature point is a first feature point, the image is a first image, and the camera is a first camera, the method further comprising extracting, by the processing device, a second feature point on the trailer from a second image captured by a second camera associated with the vehicle.

5. The computer-implemented method of claim 4, wherein the distance between the first feature point on the trailer and the virtual boundary is determined based at least in part on a triangulation process.

6. The computer-implemented method of claim 1, wherein the threshold is based at least in part on a road characteristic and a vehicle speed.

7. A system comprising:
a memory comprising computer readable instructions; and
a processing device for executing the computer readable instructions for performing a method comprising:
extracting, by the processing device, a feature point on a trailer from an image captured by a camera associated with a vehicle, wherein the trailer is coupled to the vehicle;
determining, by the processing device, a virtual boundary that represents a physical boundary, wherein the virtual boundary is determined by detecting the physical boundary using image processing techniques on an image captured by the camera associated with the vehicle, wherein the physical boundary is a curb;
determining, by the processing device, a distance between the feature point on the trailer and the virtual boundary; and
responsive to determining that the distance between the feature point on the trailer and the virtual boundary is less than a threshold, increasing the distance between the feature point on the trailer and the virtual boundary by controlling, by the processing device, the vehicle.

8. The system of claim 7, wherein the method further comprises generating, by the processing device, the virtual boundary based at least in part on a detected road feature.

9. The system of claim 7, wherein the method further comprising, prior to the extracting the feature point, capturing a plurality of images using the camera, wherein the image is one of the plurality of images.

10. The system of claim 7, wherein the feature point is a first feature point, the image is a first image, and the camera is a first camera, wherein the method further comprises extracting, by the processing device, a second feature point on the trailer from a second image captured by a second camera associated with the vehicle.

11. The system of claim 10, wherein the distance between the first feature point on the trailer and the virtual boundary is determined based at least in part on a triangulation process.

12. The system of claim 7, wherein the threshold is based at least in part on a road characteristic and a vehicle speed.

13. A computer program product comprising:
a non-transitory computer readable storage medium having program instructions embodied therewith, the program instructions executable by a processing device to cause the processing device to perform a method comprising:
extracting, by the processing device, a feature point on a trailer from a first image captured by a first camera associated with a vehicle, wherein the trailer is coupled to the vehicle;
extracting, by the processing device, the feature point on the trailer from a second image captured by a second camera associated with the vehicle;
determining, by the processing device, a position of the feature point using a triangulation process, wherein the position of the feature point is determined within a bounded error, the bounded error being based at least in part on a length of the trailer, a pitch angle, and a location of the feature point;
determining, by the processing device, a virtual boundary that represents a physical boundary, wherein the virtual boundary is determined by detecting the physical boundary using image processing techniques on an image captured by the camera associated with the vehicle;
determining, by the processing device, a distance between the feature point on the trailer and the virtual boundary; and
responsive to determining that the distance between the feature point on the trailer and the virtual boundary is less than a threshold, controlling, by the processing device, the vehicle to cause the distance between the feature point on the trailer and the virtual boundary to increase.

14. The computer program product of claim 13, wherein the method further comprises generating, by the processing device, the virtual boundary based at least in part on a detected road feature.

15. The computer program product of claim 13, wherein the method further comprising, prior to the extracting the feature point, capturing a plurality of images using the first camera, wherein the image is one of the plurality of images.

16. The computer program product of claim 13, wherein the feature point is a first feature point, wherein the method further comprises extracting, by the processing device, a second feature point on the trailer from a third image captured by a third camera associated with the vehicle.

17. The computer program product of claim 16, wherein the distance between the first feature point on the trailer and the virtual boundary is determined based at least in part on a triangulation process.

* * * * *